W. B. SNYDER.
Spring Scales.
No. 46,592.
Patented Feb. 28, 1865.
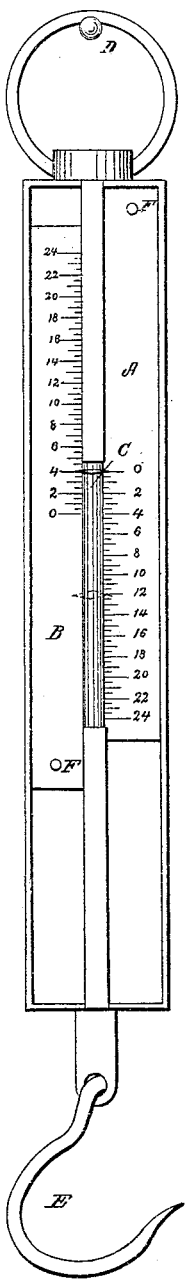

UNITED STATES PATENT OFFICE.

WILLIAM B. SNYDER, OF LAKEVILLE, CONNECTICUT.

IMPROVEMENT IN SPRING-BALANCES.

Specification forming part of Letters Patent No. 46,592, dated February 28, 1865.

*To all whom it may concern:*

Be it known that I, WILLIAM B. SNYDER, of Lakeville, in the town of Salisbury, county of Litchfield, and State of Connecticut, have invented a new and useful Improvement in the Mode of Constructing Spring Weighing-Balances; and I do hereby declare that the following is a correct description of the same, reference being had to the accompanying drawing, and to the letters of reference marked thereon.

The nature of my invention consists in the arrangement of two sliding indexes on the face of the balance.

To enable others skilled in the art to make and use my invention, I will proceed to describe the construction and operation.

The figure is a face view of the balance and the sliding indexes.

A represents the right-hand slide; B, the left-hand slide; C, the pointer; D, the suspending-ring; E, the hook.

The general formation of my balance, the spiral spring, and other attachments I construct in the usual manner. The two sliding indexes A and B are composed of thin metal slips, and are placed on the face of the balances between narrow thin strips of metal attached to the front plate, and form grooves or rabbets to receive the slides and to allow them to work up and down easily, and are moved by means of the small knobs F at the ends to adjust them as required. The slides A and B are slightly bent to a curved form before being placed in position in the grooves, and the natural tendency of the same to straighten out causes them to give a gentle pressure on the groove, so that they may be easily moved up and down by the action of the hand on the small knobs F, and cause them to remain stationary in any required position when in use. On the slides A and B, I mark the index of pounds and fractions of pounds in the usual manner. The right-hand slide, A, is marked with the zero or standing point at the top, numbering downward, and the left-hand slide, B, with the zero or starting point at the bottom, and numbering upward to any required quantity.

The operation: Hang the pail or other article to receive the goods to be weighed on the hook E; then move the left-hand slide, B, down till the zero is opposite the pointer C. This gives a register of the weight of the pail, which will be indicated by its being taken off and the pointer rising to its position. Now move the right-hand slide, A, down till the two zeros are opposite; put in the article to be weighed, and the pointer will descend and show the net weight of the article on the slide A. In weighing the article in the gross the slide A will indicate the whole weight; then move the slide B down till the zero is opposite the indicated weight; then take out any required quantity, and the pointer C will rise and point to the amount taken out or off on the scale B. The utility of this arrangement of the two slides is in the convenience for showing the gross and net weights, the slide B keeping a memorandum of the different weights, avoiding the necessity of figuring up and calculating the different weights and making mistakes.

What I claim as my invention, and desire to secure by Letters Patent, is—

The arrangement of the two sliding indexes to weighing-balances in the manner and for the purpose substantially as herein set forth and described.

WILLIAM B. SNYDER.

Witnesses:
  WM. VINE,
  WILLIAM R. SEELEY.